2,802,033

OXIDATION OF ALKYLMERCAPTOACETO-PHENONES

Walter A. Gregory, Ralph K. Iler, and Rudolph Schlatter, Wilmington, Del., assignors to E. I. du Pont de Nemours and Company, Wilmington, Del., a corporation of Delaware No Drawing. Application January 27, 1955,
Serial No. 484,591

4 Claims. (Cl. 260—592)

This invention relates to an improved process for the preparation of alkylsulfonyl- and alkylsulfinyl-acetophenones. More particularly, the invention is directed to the oxidation of alkylmercaptoacetophenones using phosphoric acid-stabilized hydrogen peroxide in the presence of a lower aliphatic monocarboxylic acid.

According to the present process an alkylmercaptoacetophenone of the formula

1.

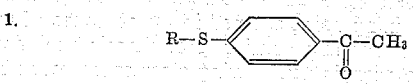

where R is alkyl having from 1–3 carbon atoms, is mixed with hydrogen peroxide in the presence of phosphoric acid and an organic acid of the formula 2. 

where R is a member of the class consisting of hydrogen and a methyl group to produce a compound of the formula

3.

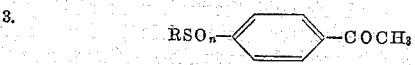

where $n$ is an integer of from 1 to 2 and R have the same significance as in Formula 1.

The alkylmercaptoacetophenones of Formula 1 are oxidized to either the corresponding alkylsulfinyl- or alkylsulfonyl-acetophenones depending on the molar ratio of hydrogen peroxide to mercaptoacetophenone used. More will be said about this later.

We have found surprisingly that the yield of the oxidized product, that is, the alkylsulfinyl- or alkylsulfonyl-acetophenones of Formula 3, is substantially increased by carrying out the oxidation in the presence of a small amount of phosphoric acid. For example, methylmercaptoacetophenone has been oxidized heretofore with hydrogen peroxide to methylsulfonylacetophenone in yields not higher than about 70%. By the addition of phosphoric acid to the reaction mixture, yields of at least 95% can be consistently realized. Not only is there a substantial improvement in yield when the phosphoric acid is present but the resulting product is of higher purity.

Still other advantages, we have found, result from carrying out oxidation processes in accordance with the present invention. Less hydrogen peroxide is needed. In fact the quantity of hydrogen peroxide used can be cut in half provided a minor amount of phosphoric acid is present in the reaction system. Additionally a large reduction in reaction time is achieved.

The phosphoric acid can be added either to the reaction mixture alone or it can be added to both the reaction mixture and the hydrogen peroxide. It is preferred that 85% phosphoric acid ($H_3PO_4$) be used. However, it will be understood that any of the precursors of phosphoric acid, such as for instance, $P_2O_5$ can be used provided of course the proper amount is employed.

Broadly speaking, the amount of 85% phosphoric acid added to the reaction mixture should equal about 0.01 to 3% of the weight of the acetophenone. The preferred quantity of phosphoric acid based on the weight of the acetophenone is in the range of from 0.1 to 1.5 percent. The quantity of 85% phosphoric acid which can be added directly to the hydrogen peroxide, this being in addition to the acid added to the reaction mixture, should be about one-half to three-quarters of the amount added directly to the reaction mixture.

The reactants, that is, the mercapto compound of Formula 1 and hydrogen peroxide, are brought together in the presence of a solvent selected from the class consisting of acetic acid and formic acid. The water content of the solvent can vary broadly, say, from 0 to 50%. Preferably the water content of the formic or acetic acid used is no greater than 10%.

The ratio of solvent to the alkylmercaptoacetophenone may vary on a weight basis from about 5:1 to 1:1. The preferred ratio is from 2:1 to 1:1.

The hydrogen peroxide which is used in the process of our invention can contain varying amounts of water. Broadly, the hydrogen peroxide solution should contain from about 20 to 80% hydrogen peroxide. It is generally preferred to use hydrogen peroxide solutions containing 30–60% $H_2O_2$. The hydrogen peroxide solution can be of a commercial grade.

The mole ratio of hydrogen peroxide (100% $H_2O_2$): mercaptoacetopheonone of Formula 1 can vary from about 4.0:1 to 2.0:1, the preferred mole ratio being 2.2:1. In the event that the molar ratio of 0.5 $H_2O_2$:1.0 mercaptoacetophenone is employed, the oxidation will stop at the sulfoxide stage.

In order to determine whether or not the reaction is completed, the reaction mix is sampled. The melting point is taken on the dried solid. The time for completing the oxidation may vary from about 0.5 hour to 15 hours. This variation in time is dependent upon such factors as the rate of hydrogen peroxide addition. The aforestated reaction period does not include the time required to heat the reaction mixture to reflux temperature preparatory to the addition of the hydrogen peroxide solution.

The reaction is conducted at the boiling point of the reaction mixture. This boiling point may vary depending upon the acid solvent used, the amount of water present and the molal concentration of the mercapto compound being oxidized.

The hydrogen peroxide solution, with or without the phosphoric acid, is added to the refluxing reaction mixture. During the course of the addition of the hydrogen peroxide, the temperature of the reaction mixture may decrease slightly; however, the rate and amount of this decrease will depend upon the specific reaction being run.

In order to better understand this invention, reference should be had to the following illustrative examples which are given in addition to those already generally indicated above.

Example 1.—Preparation of p-methylsulfonylacetophenone

A mixture consisting of 30.2 pounds (0.182 lb. mole) of p-methylmercaptoacetophenone (M. P. 78–79° C.), 60 pounds of glacial acetic acid, and 236 grams of 85% phosphoric acid is heated to boiling. To this boiling mixture there is added a total of 46 pounds (0.425 lb. mole; 19% excess) of 31.46% hydrogen peroxide containing 0.35 pound of 85% phosphoric acid over a period of about 140 minutes. The mixture is boiled until the melting point of a grab sample reached 124° C. This required a period of 60 minutes.

The solution is then cooled to 50° C. by circulating cooling water through the jacket of the reaction vessel. A mixture consisting of 70 pounds of crushed ice and 13.5 gals. of water is added. This gives a final ratio of acetic acid to water of 1:3.35.

The temperature of the reaction mixture is thereby reduced to 0–10° C. The mixture is maintained at this temperature for a period of about 75 minutes. The liquid portion of the resulting slurry is drawn off through a filter stick.

The residue is reslurried with 10 gals. of ice water; the slurry is filtered on a Nutsche, and washed with 10 gals. of ice water. The resulting residue is dried in a circulating oven for a period of 3 days at a temperature of 40° C. under atmospheric pressure. The final product consisting essentially of p-methylsulfonylacetophenone is a white crystalline solid weighing 34.9 pounds, M. P. 124–126° C. Correcting for samples removed during the reaction, the yield of p-methylsulfonylacetophenone is 96 percent of theory.

Under substantially the same conditions as set forth in the above example, except that no phophoric acid is used, there is obtained a brown crystalline product consisting of crude p-methylsulfonyl acetophenone, M. P. 124–125° C. in a yield of 72.5%.

*Example 2.—Preparation of p-methylsulfinylacetophenone*

A mixture consisting of 99.7 grams (0.6 mole) of p-methylmercaptoacetophenone, 200 ml. of glacial acetic acid and 1.7 grams (1.0 ml.) of 85% phosphoric acid is heated to boiling. To the boiling mixture there is added 65.7 grams (0.6 mole) of 31.02% hydrogen peroxide containing 0.5 grams (0.3 cc.) of phosphoric acid over a period of 11 minutes. The reaction mixture is boiled for an additional 17 minutes.

The resulting solution is cooled and then filtered to remove a small amount of gelatinous material. The filtrate is evaporated to dryness under reduced pressure on a steam bath. The residue is a bright red oil which crystallizes when placed in an ice bath. Crystallization from chloroform-carbon tetrachloride mixture gives 87 grams (79.5%) of pale tan crystals consisting essentially of p-methylsulfinylacetophenone, M. P. 104.5–107.5° C.

The products prepared by the process of our invention are intermediates in the preparation of useful chemotherapeutic agents such as, for instance, in the preparation of lower alkylsulfonylphenylamidopropanediols as described and claimed in the copending application of Walter A. Gregory, Serial No. 257,986, filed November 23, 1951, now abandoned. The alkylsulfonylacetophenones of Formula 3 can be readily converted by halogenation to alpha-halosulfonylacetophenones as described and claimed in the copending application of Walter A. Gregory, Serial No. 337,237, filed February 16, 1953, now abandoned. These alpha-halo derivatives are used as bactericides, fungicides and seed treating agents.

We claim:

1. A process for preparing a compound of the formula

where R is a member of the class consisting of alkyl groups having 1–3 carbon atoms, and $n$ is an integer of from 1 to 2; which comprises mixing in the presence of a solvent of the class consisting of formic acid and acetic acid, and in the presence of phosphoric acid, an alkylmercaptoacetophenone of the formula

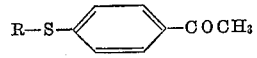

where R has the same significance as above, with a hydrogen peroxide solution containing from 20 to 80% $H_2O_2$, the mole ratio of $H_2O_2$:alkylmercaptoacetophenone being from 4.0:1 to 0.5:1.

2. A process for preparing an alkylsulfonylacetophenone of the formula

where R is a member of the class consisting of alkyl groups having 1–3 carbon atoms, which comprises mixing an alkylmercaptoacetophenone of the formula

where R has the same significance as above, with a hydrogen peroxide solution containing 20–80% $H_2O_2$, the mole ratio of $H_2O_2$:mercaptoacetophenone being 4.0:1 to 2.0:1, said mixing being effected in the presence of an organic acid of the class consisting of formic acid and acetic acid, the organic acid having a water content not exceeding 50%, the mole ratio of organic acid:mercaptoacetophenone being 5:1 to 1:1, said mixing also being effected in the presence of 85% phosphoric acid in an amount of from 0.01 to 3% by weight of mercaptoacetophenone.

3. A process which comprises mixing p-methyl-mercaptoacetophenone with hydrogen peroxide solution containing 30–60% $H_2O_2$ in the presence of glacial acetic acid and 85% phosphoric acid, the mole ratio of $H_2O_2$:p-methylmercaptoacetophenone being 2.2:1, the weight ratio of acetic acid:p-methylmercaptoacetophenone being 2:1 to 1:1, and the weight ratio of 85% phosphoric acid:p-methylmercaptoacetophenone being 0.001:1 to 0.015:1.

4. A process of claim 3 wherein 85% phosphoric acid is added to the hydrogen peroxide solution prior to mixing the solution with p-methylmercaptoacetophenone, the amount of said acid added to the solution being from 0.005 to 2.25% by weight of p-methylmercaptoacetophenone.

References Cited in the file of this patent

Goldthwait: Textile Colorist, June 1941, p. 343.

Burton et al.: Jour. Chem. Soc. (London), 601–603 (1948).

Noller: Chemistry of Organic Compounds (1951), p. 268.